(12) United States Patent
Olinski

(10) Patent No.: US 7,052,058 B2
(45) Date of Patent: May 30, 2006

(54) TOOL LEVERAGE ATTACHMENT

(76) Inventor: Matthew J. Olinski, 63 Forest St., 1st. Fl., Kearny, NJ (US) 07032

(*) Notice: Subject to any disclaimer, the term of this patent is extended or adjusted under 35 U.S.C. 154(b) by 261 days.

(21) Appl. No.: 10/637,230

(22) Filed: Aug. 11, 2003

(65) Prior Publication Data

US 2005/0035612 A1   Feb. 17, 2005

(51) Int. Cl.
*A01B 1/00* (2006.01)

(52) U.S. Cl. .................. 294/59; 294/60; 254/131.5
(58) Field of Classification Search .................. 294/58, 294/59, 60; 254/120, 129, 131, 131.5, 132
See application file for complete search history.

(56) References Cited

U.S. PATENT DOCUMENTS

| | | | | |
|---|---|---|---|---|
| 545,536 A | * | 9/1895 | Russell | 254/131.5 |
| 1,439,492 A | * | 12/1922 | Tillar | 254/120 |
| 2,733,895 A | * | 2/1956 | Trenkle | 254/131 |
| 3,155,414 A | * | 11/1964 | Bales | 294/58 |
| 3,811,388 A | * | 5/1974 | Campbell | 111/101 |
| 4,461,458 A | * | 7/1984 | Poulin | 254/131.5 |
| 4,881,332 A | * | 11/1989 | Evertsen | 37/285 |

* cited by examiner

Primary Examiner—Dean J. Kramer
(74) Attorney, Agent, or Firm—Paul R. Gauer (57) ABSTRACT

A tool leverage attachment for use with digging or lifting tools which includes a saddle with curvilinear end, anchor channel and protruding flange together with Greek letter Pi (TT) shaped driver fulcrum consisting of a pressure bar perpendicularly affixed to protruding legs for enveloping the saddle bolt both of which are fastened together and to tool handle with U-bolt fastener.

1 Claim, 11 Drawing Sheets

TOOL LEVERAGE ATTACHMENT

This invention relates to tools, more particularly to digging and lifting tools.

PRIOR ART

The principal of fulcrum and lever has been known to man for thousands of years and applied in innumerable different ways. Some inventors have previously created tool attachments to enhance leverage such as:

U.S. Pat. No 4,042,210 filed Jun. 29, 1976 by Feldman discloses a prying tool with a fulcrum member, which is movable.

U.S. Pat. No. 5,535,649 filed Feb. 28, 1995 by Waggle discussed an extender for a hand tool in order to increase leverage.

U.S. Pat. No. 5,836,222 filed Nov. 17, 1998 by Harpell is for a shingle removing tool with angled handle for leverage.

U.S. Pat. No. 5,931,059 filed Mar. 10, 1998 by Hammer for a bucket lid remover with screwdriver handle for leverage.

U.S. Pat. No. 5,937,627 filed Aug. 6, 1996 by Mc Kittrick describes a garden tool with enhanced leverage achieved through a rod frame with an arm brace at one end and a tool holder at opposite end.

U.S. Pat. No. 5,910,198 filed Aug. 1, 1997 by Maher is a lug nut wrench with added leverage obtained through a base plate.

U.S. Pat. No. 5,813,206 filed Mar. 8, 1996 by Mc Kittrick describes a garden rake with enhanced leverage achieved through a rod frame with an arm brace at one end and a rake at opposite end. All of the foregoing, however, are limited to application with a specific tool.

INVENTION SUMMARY

An object of this invention is to increase effectiveness of digging and lifting tools through enhancement of leverage. Another object of this invention is interchangeability for use with a variety of different tools.

A further object of this invention is adjustability for use in various different positions.

A still further object of this invention is to support and stabilize the selected tool during all operations.

Yet, another object of this invention is to expand point of contact area available for application of force.

Another object of this invention is to enhance digging tool penetration.

This invention consists of a saddle which can be clamped to the handle of a variety of digging or lifting tools, and a driver shaped like the Greek letter Pi (TT) with one or more sequential sets of holes. It is bolted to the saddle through one such set of holes. In use, foot or hand pressure is applied to the driver, which forms a fulcum point at the tool handle thus applying leverage to enhance the force of the tool. This device may be used with a pitchfork, shovel, pry-bar, crowbar, prospecting tool, wrecking tool and other digging, lifting or moving tools by attachment with conventional fasteners.

DRAWING DESCRIPTION

FIG. 1 Exploded perspective view
FIG. 2 Application with pitch fork
FIG. 3 Application with crow bar
FIG. 4 Application with pry bar
FIG. 5 Application by foot with prospecting tool
FIG. 6 Application by hand with prospecting tool
FIG. 7 Application with shovel—bottom perspective
FIG. 8 Application with shovel—top perspective
FIG. 9 Application with shovel
FIG. 10 Top View
FIG. 11 Side View

PREFERRED SPECIFICATION

Figure 1:
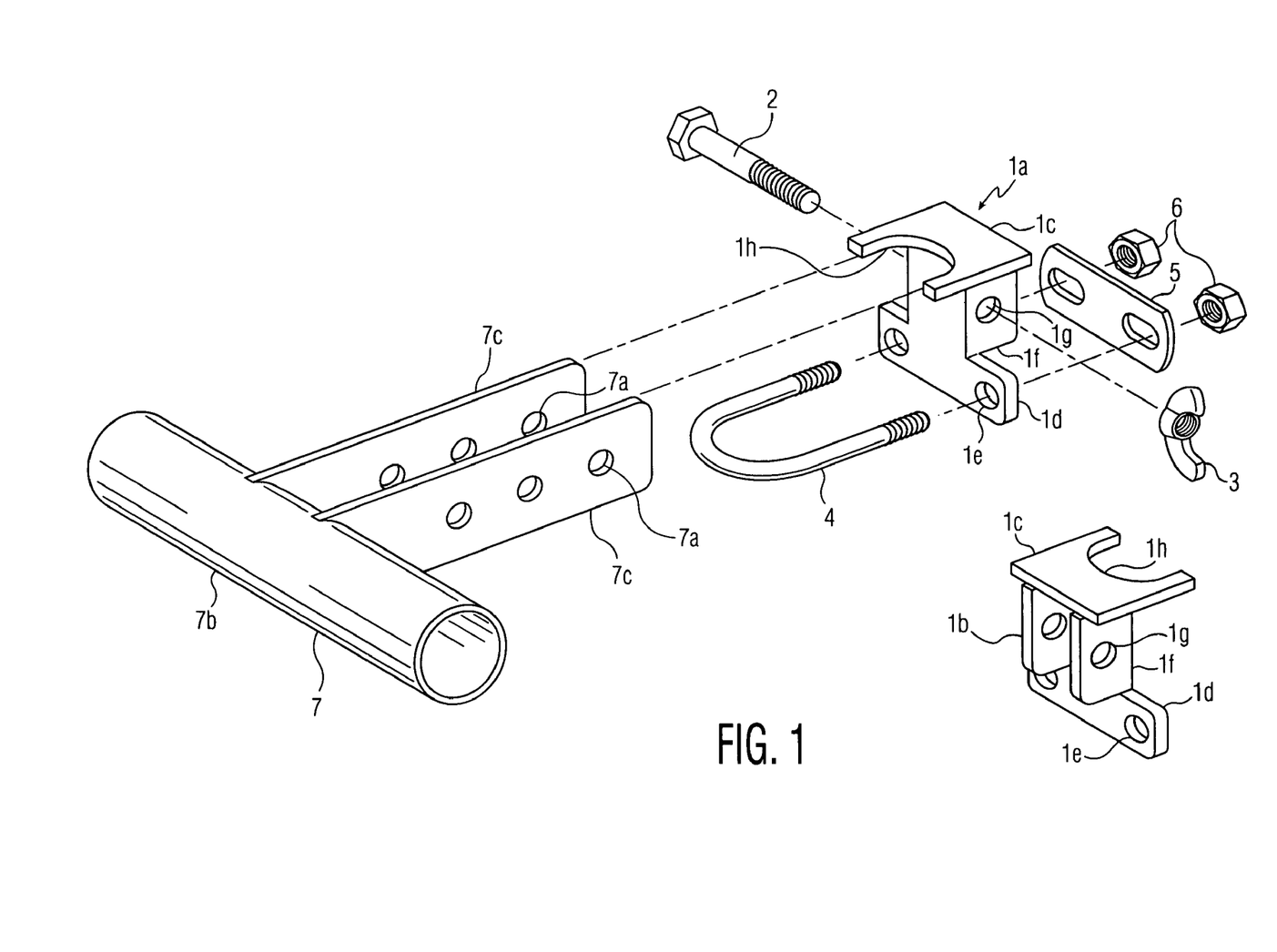

In FIG. 1 the saddle (1a and 1b) has saddle plate 1c with U shaped cut out 1h to snuggly fit a tool handle, a saddle flange 1d with clamp holes 1e and an anchor channel 1f with anchor holes 1g.

A conventional U-bolt 4 will insert through clamp holes 1e, washer 5 and nuts 6 in order to fix the saddle against a tool handle. Saddle anchor channel 1f receives anchor bolt 2 through anchor holes 1g, which also passes through adjuster holes 7a in driver 7 and is held in place by anchor nut 3. Driver 7 consists of pressure bar 7b with two protruding legs 7c having holes 7a for adjusting distance and leverage.

Figure 2:
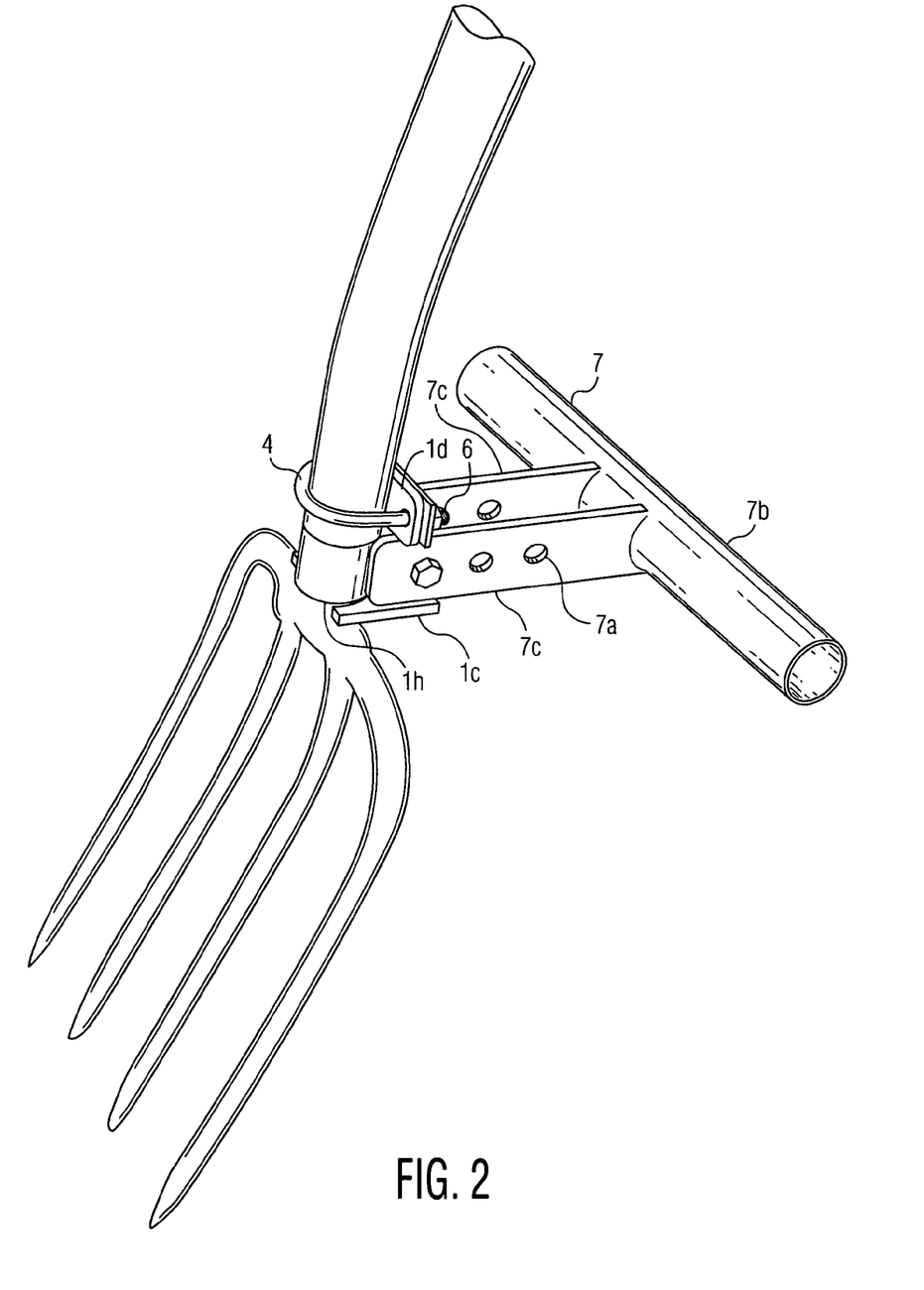

FIG. 2 shows saddle plate 1c with U shaped cut out 1h aligned against a pitch fork handle held in position by U-bolt 4 through flange 1d and nuts 6 and further fastened to driver 7 with anchor bolt through adjuster holes 7a in driver 7. Also visible are legs 7c and pressure bar 7b.

Figure 3:
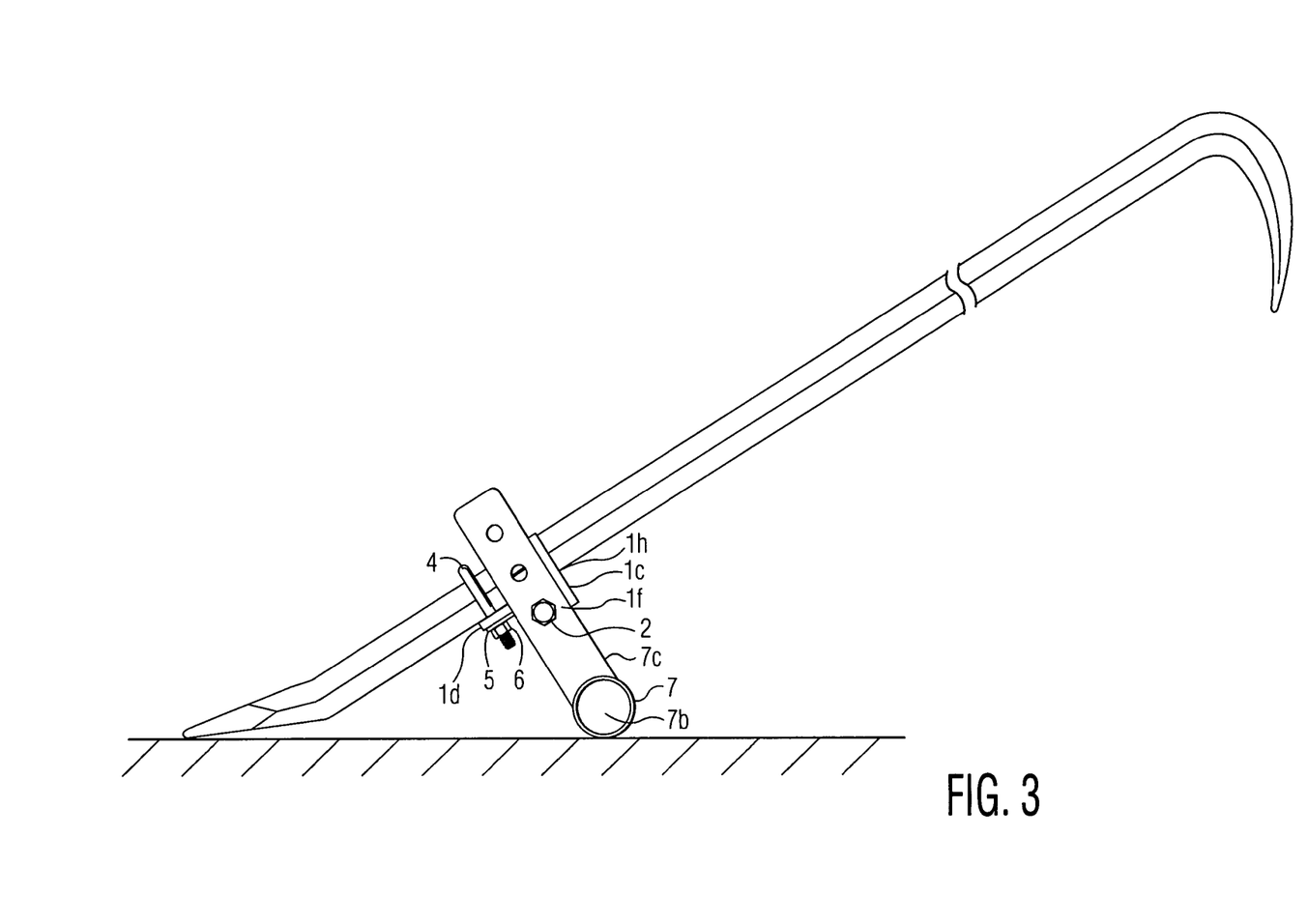

FIG. 3 depicts saddle plate 1c with U shaped cut out 1h snuggly against crow bar and affixed by U-bolt 4, through saddle flange 1d, washer 5 and nuts 6. Driver 7 is fastened to saddle at anchor channel 1f with anchor bolt 2. Also visible are driver legs 7c and side view of pressure bar 7b.

Figure 4:
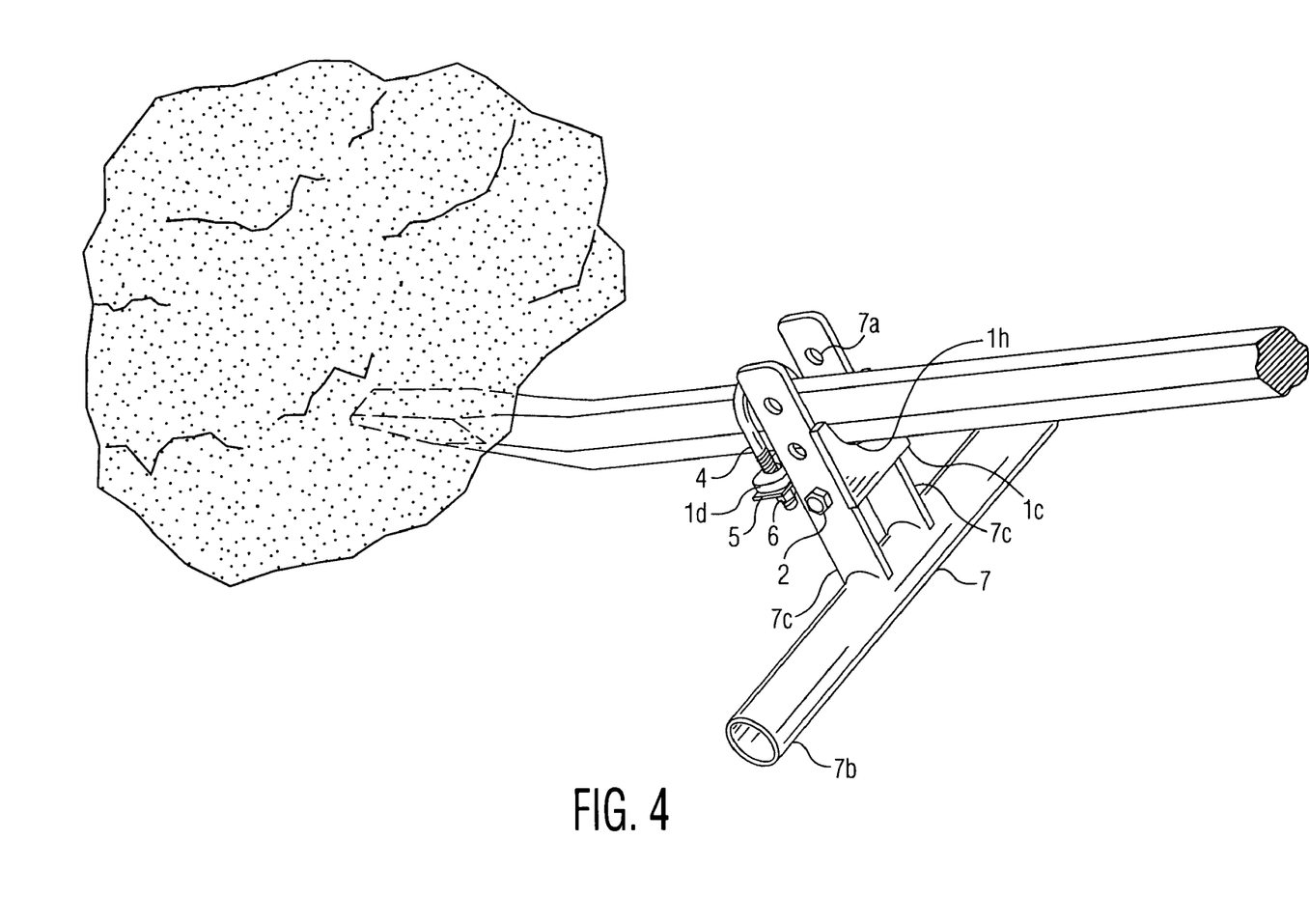

FIG. 4 demonstrates saddle plate 1c with U-shaped cut out 1h snuggly against pry bar. Saddle flange 1d is fastened to pry bar with U-bolt 4, washer 5 and nuts 6. Driver 7 straddles the saddle 1 and driver 7 legs 7c are connected to saddle 1 with anchor bolt 2. Two driver legs 7c are welded to pressure bar 7b. In this instance, there are three sets of holes 7a for adjusting distance and leverage.

Figure 5:
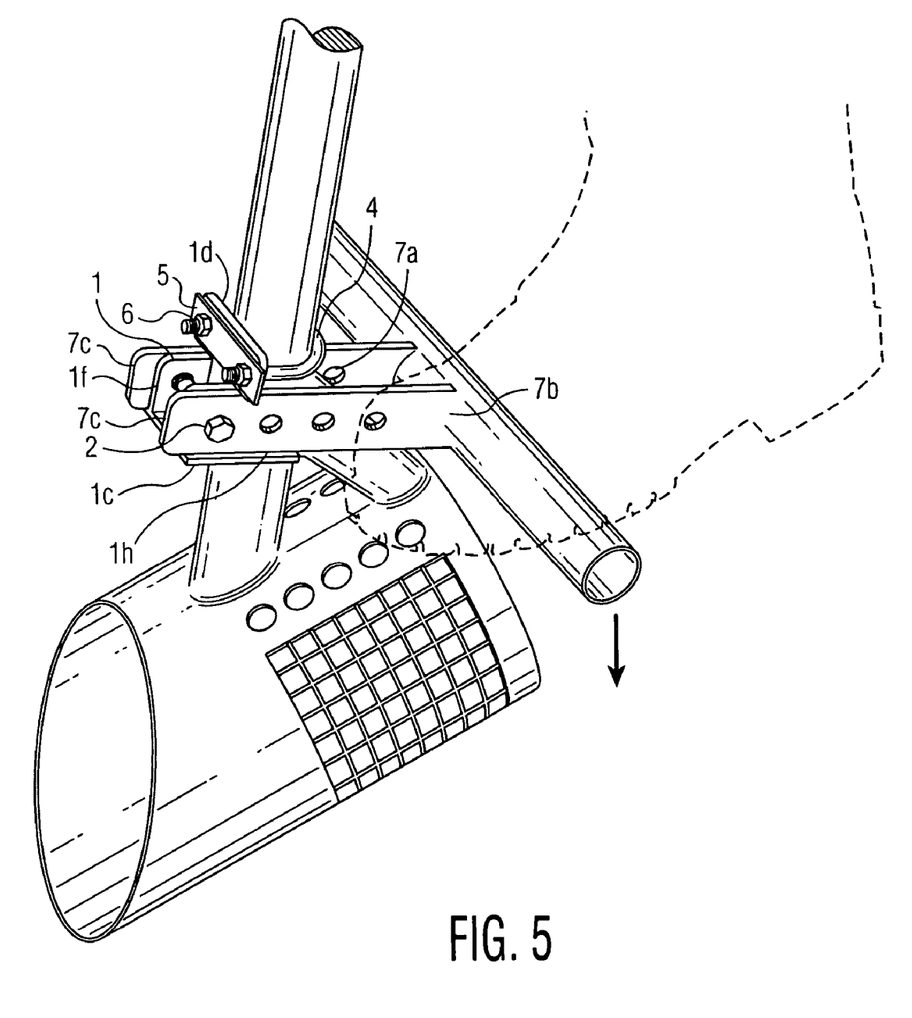

FIG. 5 contains inventor's device affixed to sifter tool. Saddle plate 1c with U-shaped cut out 1h sits directly beneath and supports driver legs 7c. Driver legs 7c are welded to pressure bar 7b. In this case the driver legs 7c have four sets of adjusting holes 7a, Saddle 1 is further connected to driver 7 through adjusting holes 7a with anchor bolt 2 passing through driver legs 7c at first set of adjusting holes 7a and also through anchor channel 1f. Saddle flange 1d is fastened to tool handle by U-bolt 4, washer 5 and nuts 6. Foot imprint is shown where force would be applied.

Figure 6:
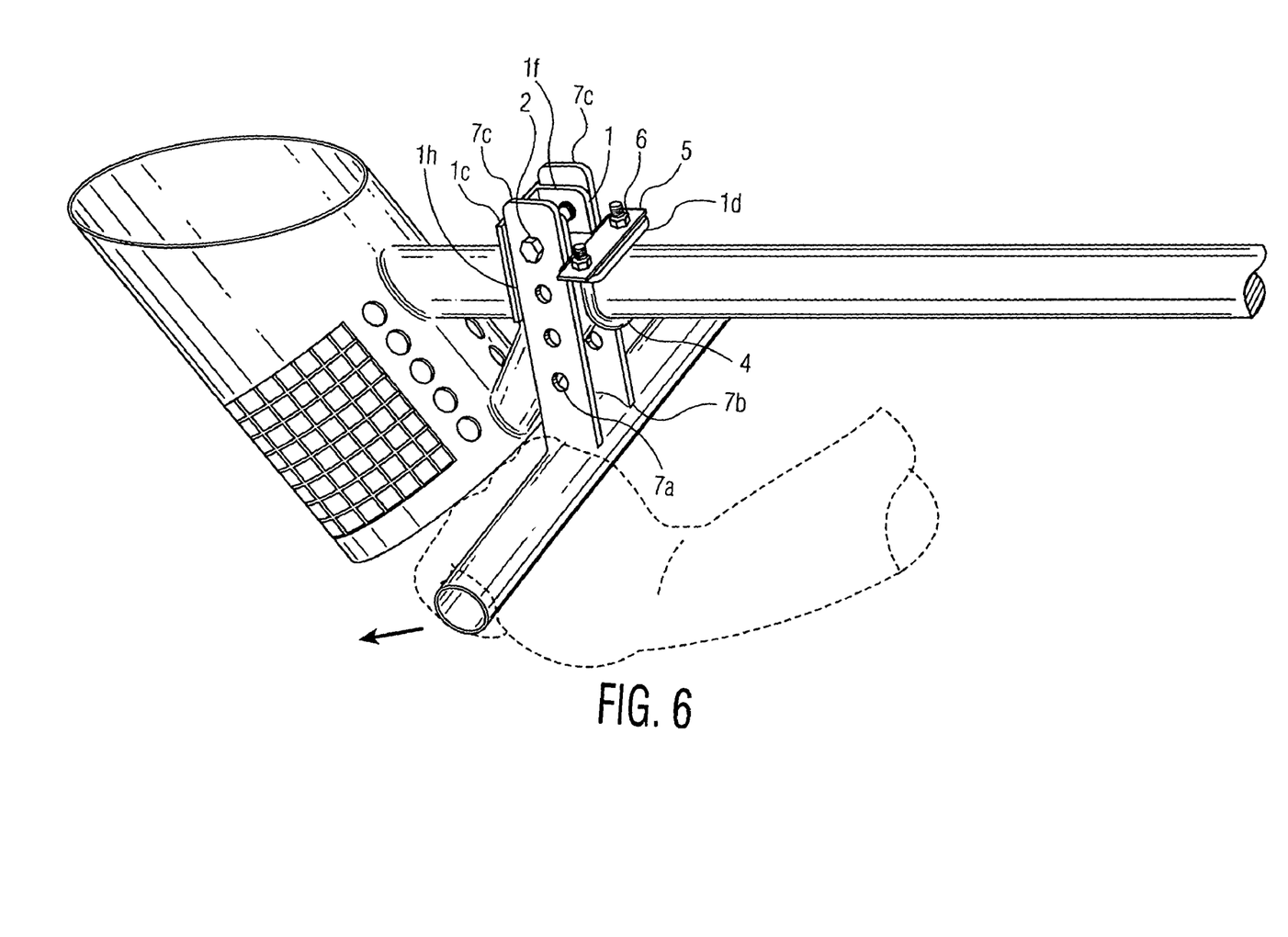

FIG. 6 contains inventor's device affixed to sifter tool. Saddle plate 1c with U-shaped cut out 1h sits directly beneath and supports driver legs 7c. Driver legs 7c are welded to pressure bar 7b. In this case the driver legs 7c have four sets of adjusting holes 7a. Saddle 1 is further connected to driver 7 through adjusting holes 7a with anchor bolt 2 passing through driver legs 7c at first set of adjusting holes 7a and also through anchor channel 1f. Saddle flange 1d is fastened to tool handle by U-bolt 4, washer 5 and nuts 6. Hand imprint is shown where force would be applied.

Figure 7:
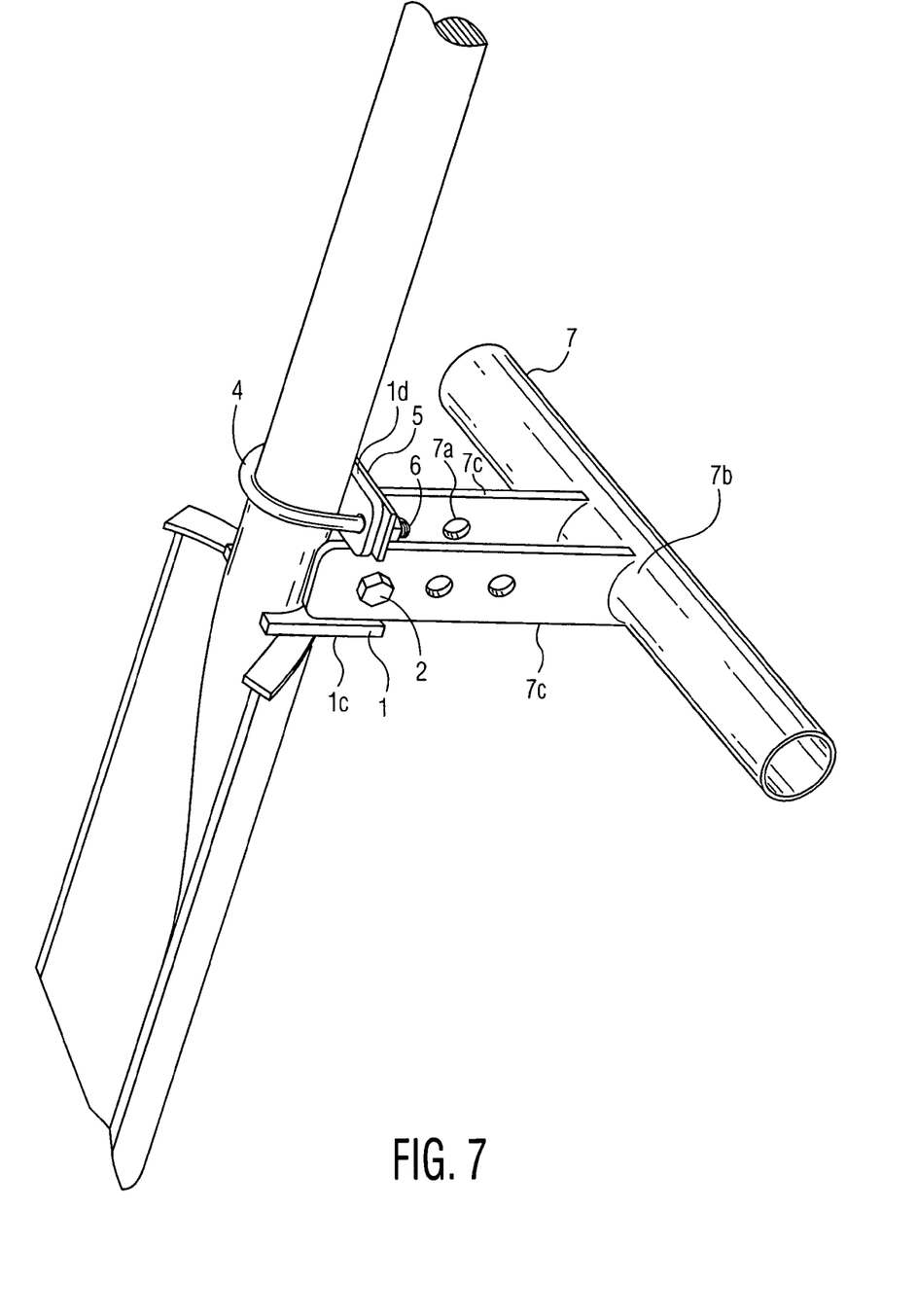

FIG. 7 displays application with shovel. Driver 7 has cylindrical pressure bar 7b joined to driver legs 7c which in this example have three sets of adjusting holes 7a. The first adjusting hole 7a is occupied by anchor bolt 2. Saddle 1 is visible at saddle plate 1c and flange 1d. U-bolt 4 firmly secures shovel handle to saddle flange 1d with washer 5 and nuts 6.

Figure 8:
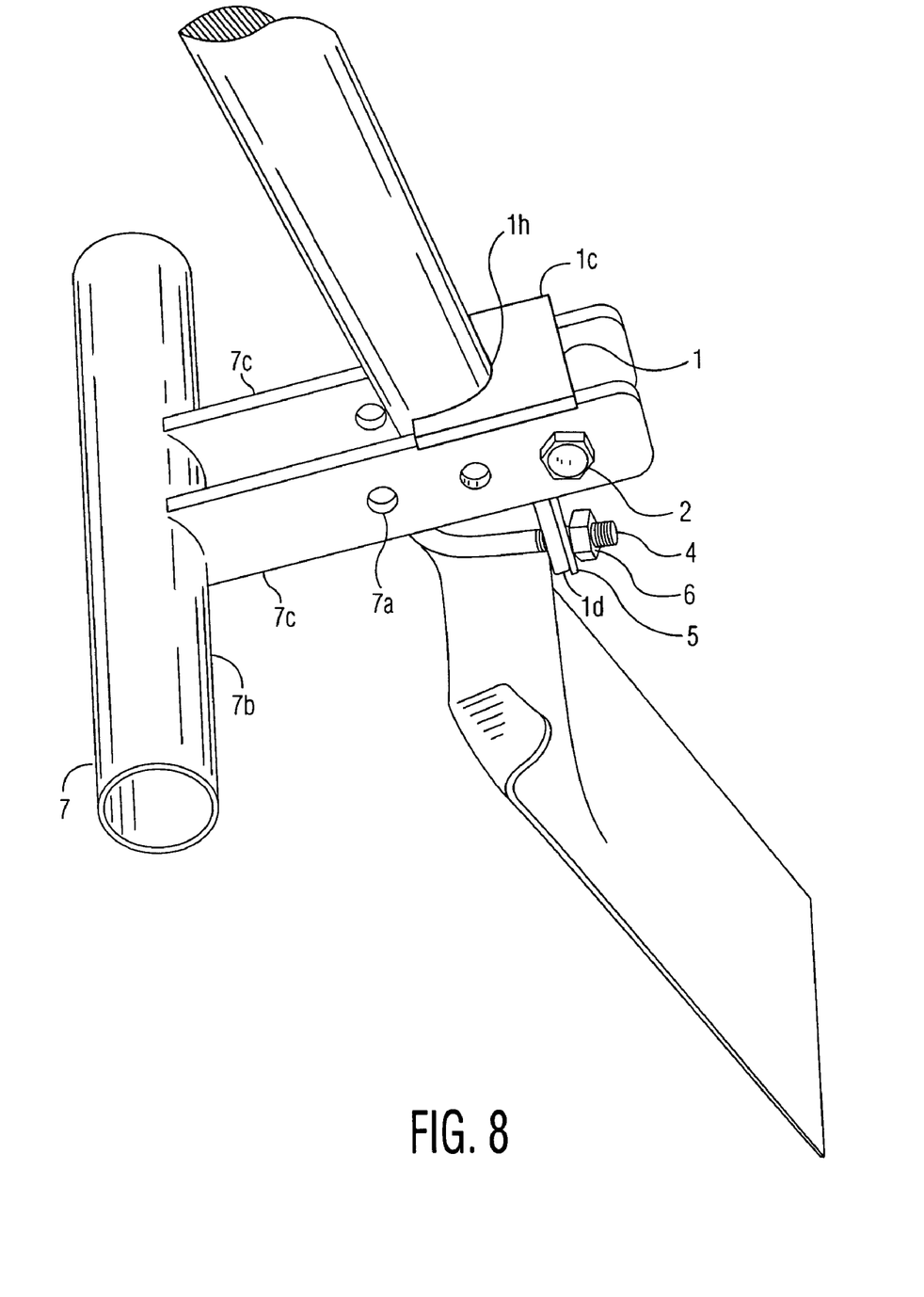

FIG. 8 contemplates driver 7 with pressure bar 7b connected to driver legs 7c having three sets of adjusting holes, one occupied by anchor bolt 2. Saddle 1 is juxtaposed between driver legs 7c with saddle plate 1c protruding and set against shovel handle and with saddle flange 1d fastened by U-bolt 4, washer 5 and nuts 6.

Figure 9:
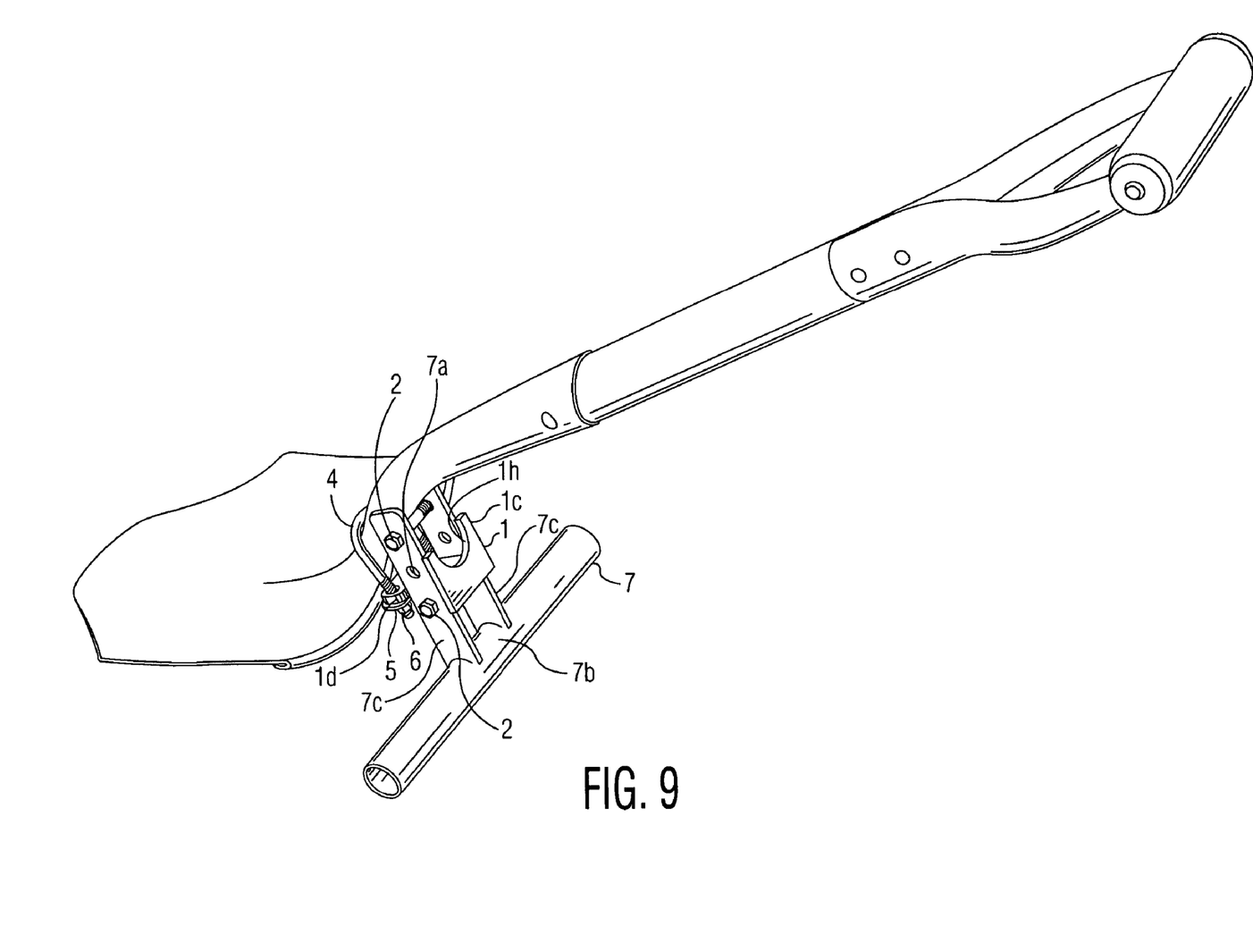
Figure 10:
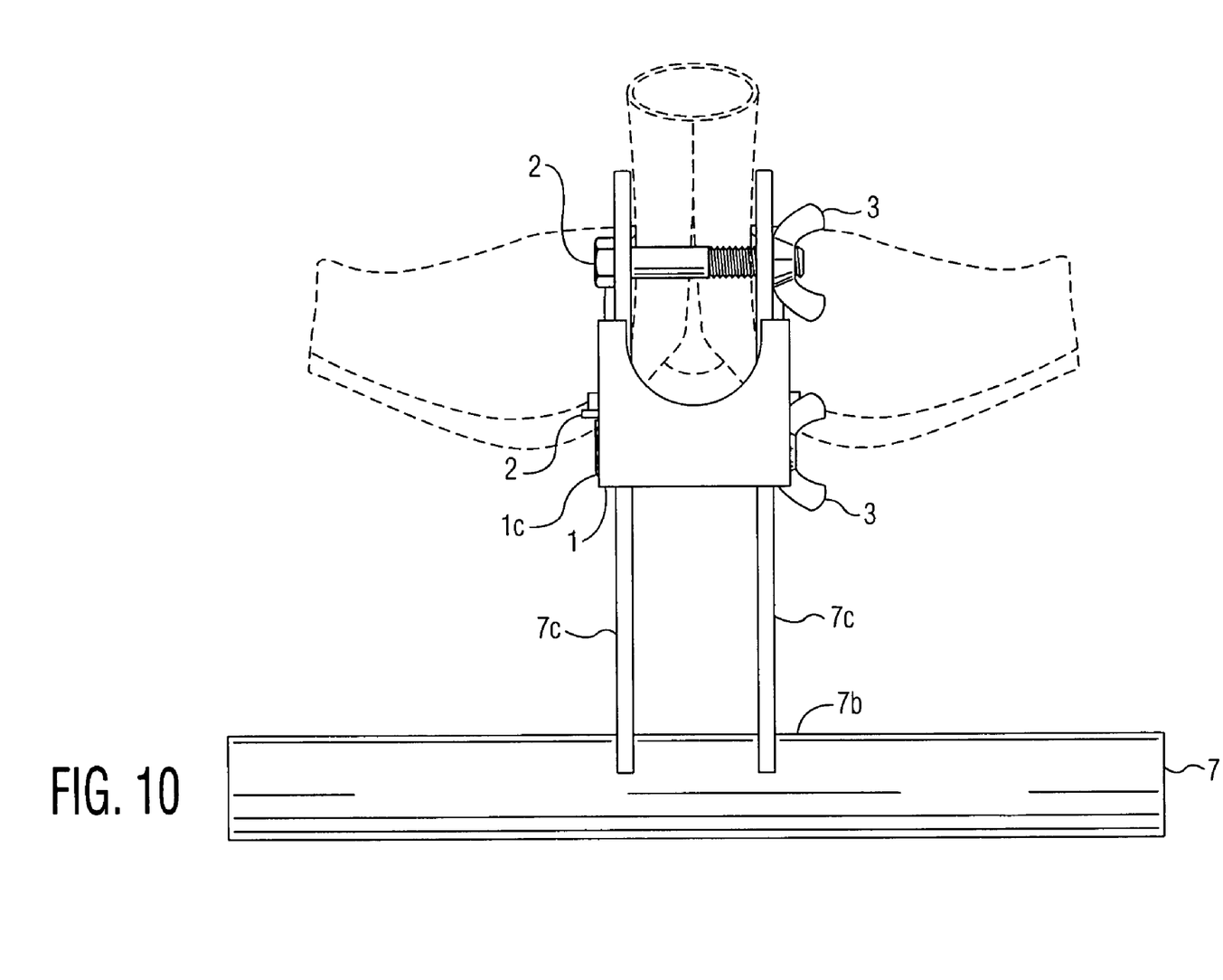
Figure 11:
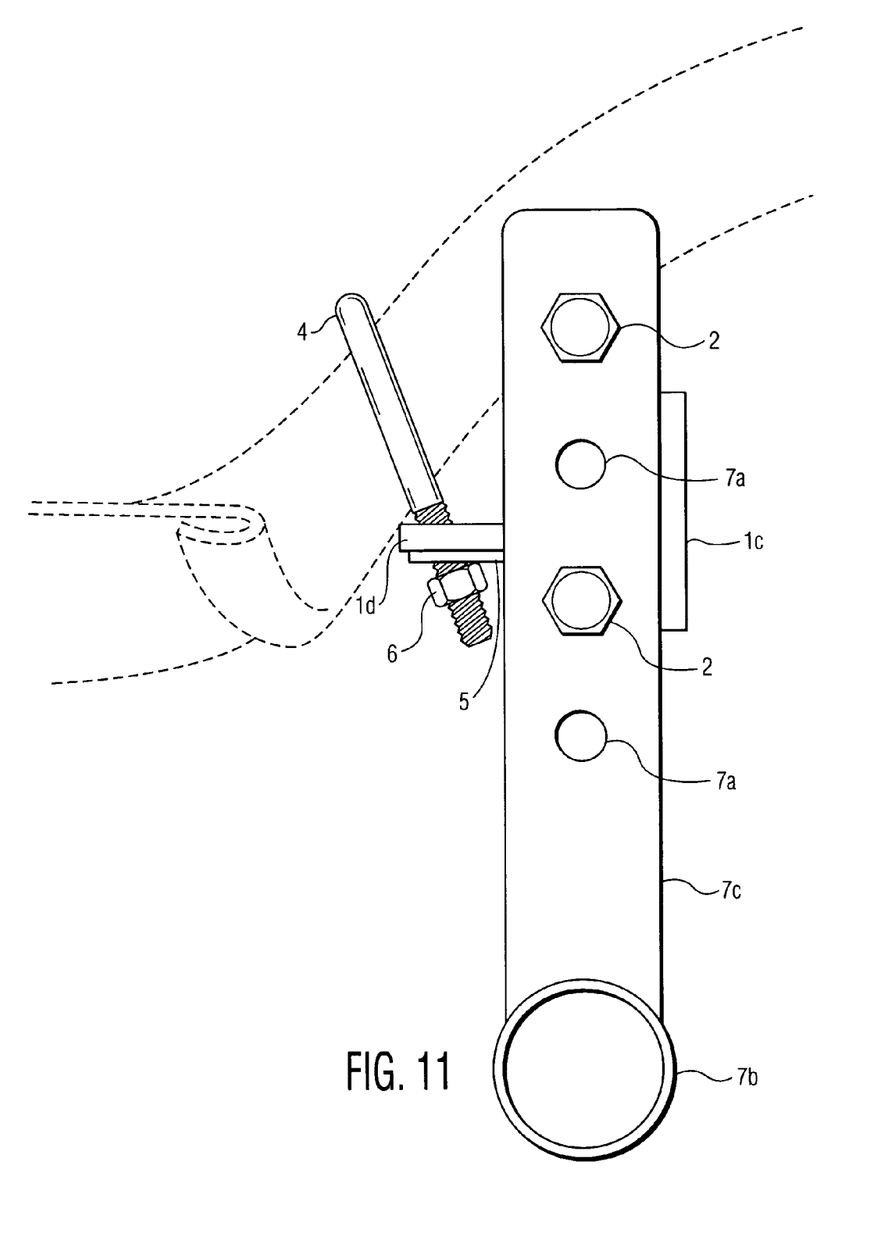

FIG. 9 reveals driver 7 having pressure bar 7b integrated with two driver legs 7c all straddling saddle 1 with saddle plate 1c visible and connected via anchor bolt 2 passing through driver legs 7c. In this embodiment, a second anchor bolt 2 crosses via another set of adjusting holes 7a and presses against shovel. On the opposite side of driver 7 is shown saddle flange 1d fastened to shovel with U-bolt 4, washer 5 and nuts 6. FIGS. 9, 10 and 11 are examples of alternate attachment of device to tool with severe handle curvature.

FIG. 10 pictures driver 7 with pressure bar 7b integral with two driver legs 7c which envelope saddle 1. Saddle portion shown is saddle plate 1c. Two anchor bolts 2 are utilized as in FIG. 9 but with anchor nuts 3 now visible.

FIG. 11 reviews a cylindrical driver pressure bar 7b annexed to driver leg 7c with two anchor bolts occupying two of in this case four adjusting holes 7a. Interior to the driver legs 7c is found saddle plate 1c and saddle flange 1d. Saddle flange 1d, U bolt 4 and one anchor bolt 2 all help secure shovel handle and nut 6 finalizes security.

The invention claimed is:

1. A tool leverage attachment consisting of a saddle which has a curvilinear end, central anchor channel and clamp end together with Greek letter Pi (TT) shaped driver fulcrum consisting of a pressure bar perpendicularly affixed to protruding legs for enveloping said saddle and U-bolt for fastening the legs around a tool handle.

* * * * *